Nov. 3, 1959     J. M. JACKSON ET AL     2,911,141
TOTALIZER SELECTING AND CONTROL MECHANISM
Filed April 2, 1957     6 Sheets-Sheet 1

INVENTOR
JOHN M. JACKSON
LOUIS E. ZURBUCHEN
KENNETH C. FLINT
CLARENCE L. COLEMAN
FRANK R. WERNER

BY

ATTORNEYS

FIG.3

Nov. 3, 1959    J. M. JACKSON ET AL    2,911,141
TOTALIZER SELECTING AND CONTROL MECHANISM
Filed April 2, 1957    6 Sheets-Sheet 4

INVENTORS,
JOHN M. JACKSON
LOUIS E. ZURBUCHEN
KENNETH C. FLINT
CLARENCE L. COLEMAN
FRANK R. WERNER

BY
Louis A. Kline
Richard Van Buren
ATTORNEYS

Nov. 3, 1959   J. M. JACKSON ET AL   2,911,141
TOTALIZER SELECTING AND CONTROL MECHANISM
Filed April 2, 1957   6 Sheets-Sheet 6

INVENTORS,
JOHN M. JACKSON
LOUIS E. ZURBUCHEN
KENNETH C. FLINT
CLARENCE L. COLEMAN
FRANK R. WERNER

BY
Louis A. Kline
Richard Van Buskum
ATTORNEYS es Patent Office 2,911,141
Patented Nov. 3, 1959

2,911,141

TOTALIZER SELECTING AND CONTROL MECHANISM

John M. Jackson, Dayton, Louis E. Zurbuchen and Kenneth C. Flint, West Carrollton, Clarence L. Coleman, Tipp City, and Frank R. Werner, Dayton, Ohio, assignors to The National Cash Register Company, Dayton, Ohio, a corporation of Maryland Application April 2, 1957, Serial No. 650,225

7 Claims. (Cl. 235—6)

The present invention relates broadly to cash registers and accounting machines and is directed particularly to the totalizer selecting and controlling equipment of such machines.

It is generally an object of this invention to provide means for increasing the totalizing capacity of a machine of comparatively small overall dimensions and of economical construction.

Another object is the provision of improved means for manually shifting a line having a plurality of sets of interspersed totalizers thereon to selectively aline said sets of totalizers with the amount actuators.

A further object is to provide a shiftable totalizer line, having a plurality of sets of interspersed totalizers thereon, with means for automatically restoring the line to a normal, or neutral, position, where the central set of totalizers on said line is in alinement with the amount actuators, and with manually operable selecting means for shifting said line in either direction from said neutral position, to aline the selected set of totalizers with the amount actuators.

With these and incidental objects in view, the invention includes certain novel features of construction and combinations of parts, a preferred form or embodiment of which is hereinafter described with reference to the drawings which accompany and form a part of this specification.

The present invention is directed to a well-known type of cash register or accounting machine, which is compact in overall dimensions and economical in construction but which nevertheless has many of the appointments and features of larger and more costly machines.

The machine is similar in appearance and in many of its structural details to the machines disclosed in copending applications for Letters Patent of the United States, Serial Nos. 341,633 and 412,464, filed March 11, 1953, and February 24, 1954, respectively, by Frank R. Werner et al., to which reference may be had for a full disclosure of the general features of the machine and other mechanism which are not pertinent to the present invention and which, even though illustrated herein, will be described only in a general way.

Mechanism pertinent to the present invention will be described in detail in the ensuing pages.

Machine in general

The mechanism of the machine chosen to illustrate the present invention is supported by and between right and left main frames 25 and 26 (Figs. 2 and 3), which are secured to a machine base (not shown) and maintained in proper spaced relationship to each other by various cross frames, rods, and shafts. The entire machine is enclosed in a suitable case or cabinet 27, which is secured at its lower edge to the machine base. In most instances, the machine is mounted on the top surface of a suitable drawer cabinet, having one or more drawers therein for the reception of cash handled by the different clerks using the particular machine.

A suitable opening in the front portion of the case 27 provides room for the machine keyboard 28 (Fig. 1), which comprises, in this particular adaptation, five denominational rows of amount keys 29, a Row 1 of control keys 30 to 34 inclusive, a Row 2 of control keys comprising five item or commodity keys 35, an item Sub-Total key 36, and four clerks' keys 37. All of the keys 30 to 34 in Row 1 are what are termed "motorized keys," in that depression of any one of these keys initiates machine operation, and the five item keys 35 and the Sub-Total key 36 in Row 2 are also motorized keys. Keys 37 in Row 2 are not motorized and must be used in conjunction with the Charge key 31 and the Cash key 32 in the final, or item total, operation of an itemizing operation, as will be explained more fully later. The clerks' keys 37 may be provided with the usual individual locks and keys for preventing the operation of said keys by unauthorized persons.

A release key 38, located to the left of the amount keys 29 (Fig. 1), is provided for releasing any inadvertently depressed amount key 29 or clerk's key 37 prior to operation of the machine. Located at the extreme left of the keyboard is a total control lever 39, often referred to as a "Unit Lock Lever," which is positionable to control the various functions of the machine. The total control lever 39 is provided with a lock 40, the keys of which may be retained by authorized persons to lock said lever against improper manipulation by unauthorized persons.

The present machine is equipped with a No. 1, or lower, totalizer line 42 (Figs. 2, 3, and 8) and a No. 2, or upper, totalizer line 43. The No. 1 totalizer line comprises four sets of totalizer wheels 44, corresponding to the No. 1 control keys 30 to 33 inclusive, and a set of item totalizer wheels 45, for use in the temporary storage of the various items of a multiple item transaction. The No. 1 totalizer line is shiftable laterally under control of the keys 30, 31, 32, 33, and 36 to select the corresponding set of totalizer wheels thereon for engagement with the amount actuators. The No. 2 totalizer line 43 comprises nine sets of totalizer wheels 46, corresponding to the No. 2 control keys 35 and 37, which keys control the lateral shifting of the No. 2 totalizer line to aline the corresponding sets of wheels 46 on said line with the amount actuators. Each of the No. 1 and No. 2 totalizer lines is provided with the usual tens transfer mechanism for transferring tens digits from lower to higher denominations in adding operations.

Inasmuch as the No. 2 totalizer line 43 supports nine sets of interspersed totalizer wheels 46, it has been provided with a novel shifting mechanism, which is automatically restored to a neutral, or central, position at the end of each machine operation, and said totalizer line is shifted, under control of the keys 35 and 37, the minimum distance in either direction from said central position to aline the selected set of totalizer wheels with the amount actuators.

The totalizer functions, such as adding, reading, and resetting, may be controlled by the Row 1 and Row 2 control keys in certain instances, and, in addition, the total control lever 39 may be used in conjunction with Row 1 and Row 2 control keys for controlling the reading and resetting functions of the totalizers on the No. 1 and No. 2 lines.

Each denominational row of amount keys 29 (Figs. 1 and 3) is provided with a differential mechanism and a corresponding transmission mechanism for transmitting the values of the depressed amount keys to the selected sets of wheels on the No. 1 and No. 2 totalizer lines in adding operations, and for transmitting the values of said depressed amount keys to a series of amount indicators 47 (Fig. 3), which are visible through suitable apertures in the front and back of the machine case 27. The amount differentials, through their corresponding transmission mechanisms, likewise transmit the values of the depressed amount keys to corresponding printing wheels, which, in cooperation with their associated impression mechanism, enter printed records of the values upon suitable record material, such as a detail strip, a receipt strip, or an insertable slip. Mechanism operating under control of any desired ones of the No. 2 control keys 35 and 37 is provided for controlling the operation of the printing mechanism upon the detail strip.

In reading and resetting operations, the wheels of the selected totalizer control the positioning of the amount differential mechanisms in the usual manner.

Mechanism which is described in a general way above, and which is pertinent to a proper understanding of the present invention, will be described in detail in the ensuing pages.

*Amount banks and differential mechanism*

The machine as at present constructed has five rows of amount keys 29 (Fig. 1), and, inasmuch as each row of amount keys is similar in construction and operation to the others, it is believed that the description of one of such rows and its associated differential and transmission mechanisms will be sufficient.

Figure 3:
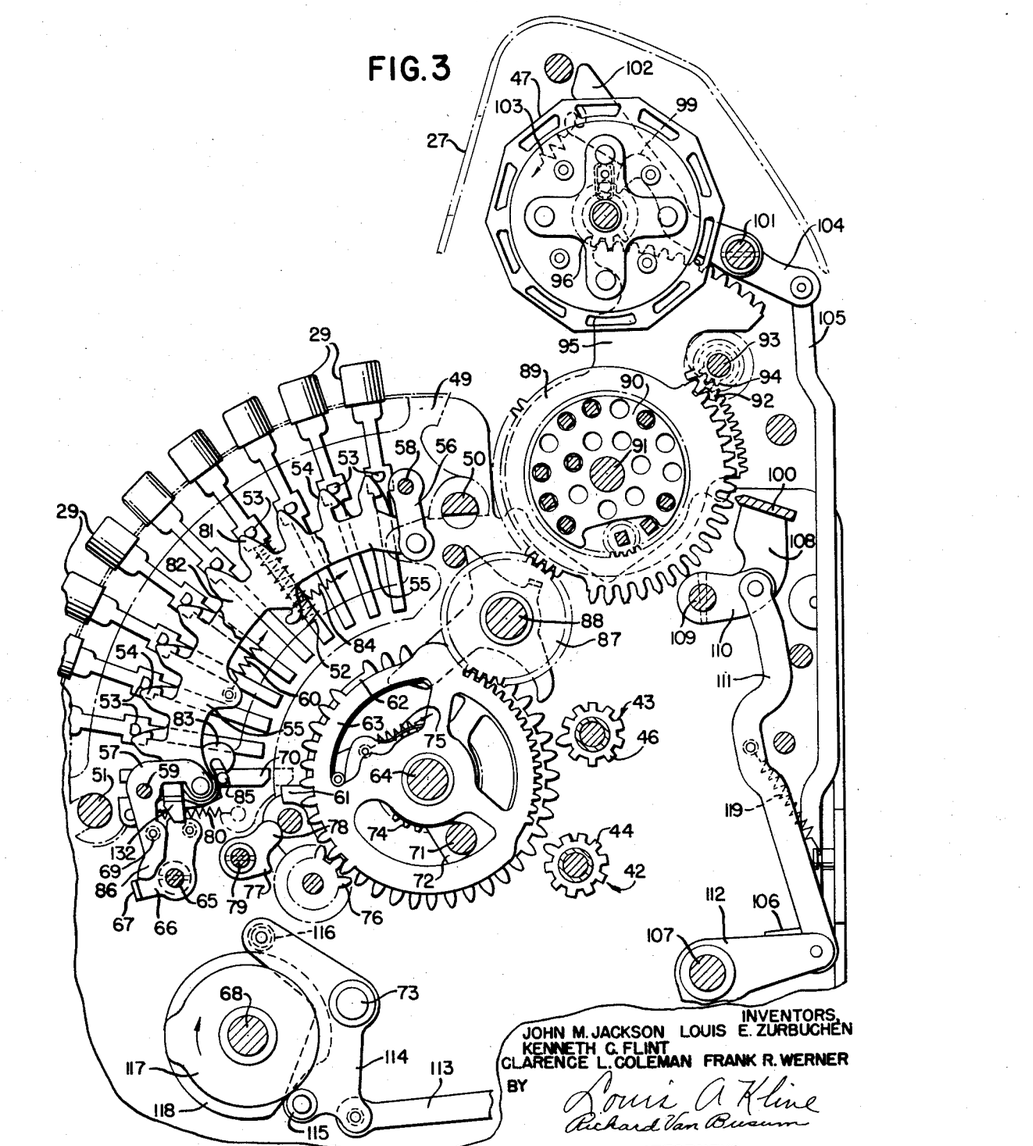
Fig. 3 is a cross-section view of the machine, taken just to the right of one of the amount banks, showing said amount bank and the differential, transmission, and indicator mechanisms associated therewith.

The amount keys 29 for the denominational row or order illustrated in Fig. 3 are shiftably supported in corresponding slots in a key bank framework 49, having at each end open slots which removably engage corresponding rods 50 and 51, in turn supported by the main framework of the machine. An undercut portion of the upper rod 50, when in a substantially horizontal position, as shown in Fig. 3, locks the key frame 49 in place on said rods 50 and 51. Turning the upper rod 50 substantially ninety degrees in a counter-clockwise direction provides clearance for swinging the key frame 49 outwardly away from said rod, after which it may be lifted off of the lower rod 51, to provide key banks which may be readily removed or installed in the machine. Compressible springs 52 encircle the lower ends of the stems of each of the amount keys 29, are confined between a shoulder on said key stems and a surface in the frame 49, and act to urge said keys 29 upwardly to their undepressed positions, as shown here.

Each of the amount keys 29 (Fig. 3) carries a pin 53, which coacts with a corresponding hook 54 formed in the periphery of a flexible detent 55 rockably supported at its upper end by a link 56 pivoted on a stud 58 in the key frame, and at its lower end by an arm 57 free on a stud 59 in the key frame 49. A spring 60 urges the detent 55 clockwise to normally maintain the hooks 54 in yielding engagement with their corresponding pins 53. Depression of an amount key 29, against the action of its spring 52, causes the pin 53 therein to by-pass the angular nose of the hook 54 until a flat upper surface of said pin moves beyond the shoulder of the hook, whereupon the spring 60 returns the detent 55 a slight distance clockwise, to latch said shoulder over said flat surface to retain the key in depressed position. After one key has been depressed in a particular denominational row, depression of another key in the same row releases the previously depressed amount key, to provide what is termed "flexible key action."

Depression of an amount key 29 moves the lower end of its stem into the path of a projection 61 on a primary differential member 62, which, with its companion secondary member 63, is rotatably supported on a differential shaft 64, journaled in the main framework of the machine.

After the proper amount keys 29 have been depressed, it is customary to release the machine for an item operation by depression of one of the Row 2 item keys 35, corresponding, in this case, to the item or commodity purchased, which in turn frees a machine release and key lock shaft 65 (Figs. 3 and 4) for clockwise releasing movement under spring tension, as fully explained in the applications referred to hereinbefore. Secured on the release shaft 65 is an arm 66 for each amount bank, having a bent-over ear 67, which, upon releasing movement clockwise of said shaft and said arm, moves over an arcuate surface formed on a downward extension 86 of the arm 57, to lock said arm and the detent 55 against movement to secure the depressed amount key 29 in depressed position, and to obstruct depression of the other amount keys in this row during machine operation. Clockwise releasing movement of the shaft 65 closes a switch mechanism (not shown) which energizes a conventional type of operating motor (not shown) and simultaneously operates a clutch mechanism (not shown) which clutches said motor to a main cam shaft 68, journaled in the machine framework, whereupon said motor drives said shaft one clockwise revolution (Fig. 3) to effect an operation of the machine.

Near the end of its rotation, the main cam shaft 68 restores the release shaft 65 and the arm 66 from clockwise released position in a counter-clockwise direction against spring action, to disengage the clutch mechanism and to open the switch for the operating motor to terminate machine operation. Counter-clockwise restoring movement of the arm 66 causes a forward surface thereon to engage a roller 69, mounted on the downward extension 86 to the arm 57 and rock said arm and the detent 55 clockwise, against the tension of the spring 60, to disengage the shoulder of the hook 54 from the pin 53, to free the depressed amount key 29 to the action of its spring 52, which immediately restores said key upwardly to undepressed position. After the depressed amount keys have been released, the shaft 65 and the arm 66 are returned part distance clockwise to normal, or intermediate, position as shown in Fig. 3. Partial depression of an amount key 29 moves the lower end of the extension 86 above and into the path of the ear 67, to obstruct clockwise releasing movement of the arm 66 and the shaft 65 when said amount key is in a partially depressed condition.

The mechanism for effecting and controlling the releasing and restoring movements of the arm 66 and the shaft 65 is fully disclosed in Figs. 15 and 16, and the description in connection therewith, in the application Serial No. 341,633.

The primary and secondary differential members 62 and 63 (Figs. 3 and 7) have therein concentric slots, through which extends a differential member leading rod 71 supported between arms 72 (only one shown) secured to the shaft 64. Cams (not shown), secured on the main cam shaft 68, operate a cam lever (not shown) free on a shaft 73, supported by the machine framework, said cam lever in turn having a sector which meshes with a gear 74 secured to the shaft 64. Clockwise revolution of the main cam shaft 68 rocks the shaft 64, the arms 72, and the leading rod 71 first clockwise from home position, as shown in Fig. 3, to the position shown in Fig. 7, and then back to home position, each machine operation.

Figures 6, 7:
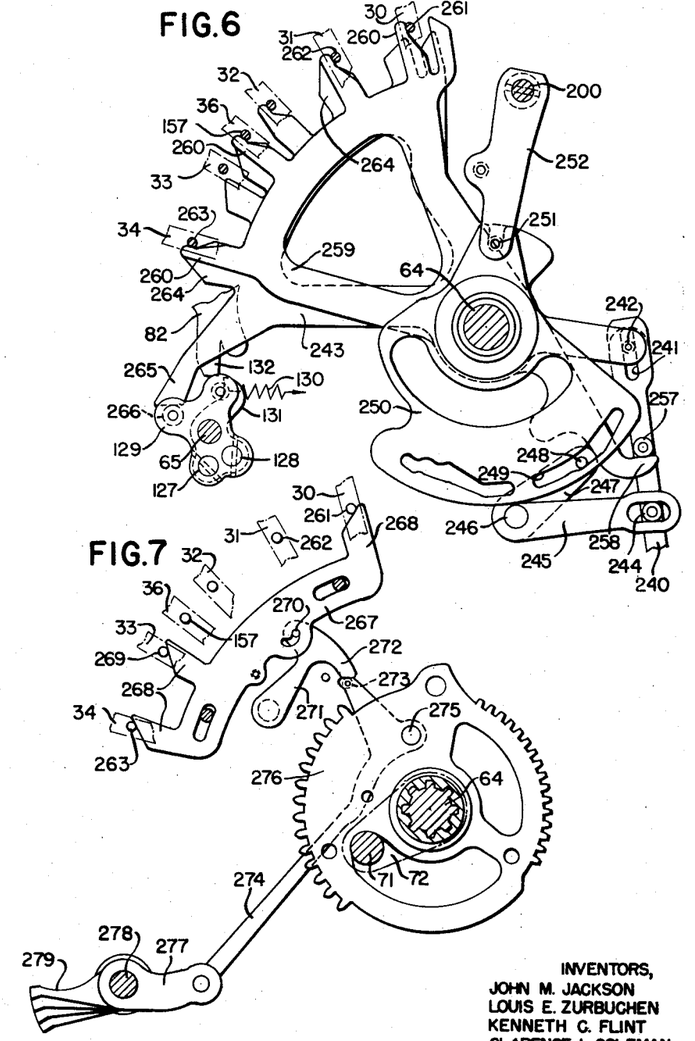
Fig. 6 is a right side elevation of a portion of the mechanism actuated by the control keys for controlling the engaging movement of the No. 2 totalizer line.
Fig. 7 is a right side elevation of the mechanism for locking certain of the Row 1 control keys for the No. 1 totalizer line against depression when the differential mechanism for said Row 1 is located in zero position.

A spring 75 is tensioned to normally maintain the rear end of the concentric slot in the primary differential member 62 in yielding engagement with the leading rod 71, as shown in Fig. 3, and initial movement clockwise of said rod permits said spring 75 to move said primary differential member 62 also clockwise in unison therewith. Such clockwise movement of the primary differential member continues until the projection 61 thereon comes into contact with the lower end of the stem of the depressed amount key 29, which stops said primary differential member in a position corresponding to the value of said depressed amount key 29. The leading rod 71 continues its initial movement without interruption and, during such movement, engages the forward end of the concentric slot in the secondary differential member 63 and restores said member from its previously set position to its zero position, as shown in Fig. 7. After the primary differential member has thus been positioned and the secondary member restored to zero position, a clutch pinion 76 (Fig. 3) for this particular denomination is engaged with teeth in the peripheries of said primary and said secondary differential members to clutch them together for unitary movement. After the clutch pinion 76 has thus been engaged, return movement of the differential leading rod 71 causes said rod to engage the rear end of the concentric slot in the primary differential member 62, restore said member counter-clockwise to home, or zero, position, and at the same time rotate the secondary differential member in unison therewith to position said secondary member in accordance with the positioning of said primary member, under control of the depressed amount key 29.

The teeth of the No. 1 and No. 2 totalizer wheels 44 and 46 (Fig. 3) are engageable with teeth in the peripheries of the primary differential members for actuation thereby, and in adding operations the corresponding ones of the selected sets of said wheels are engaged with the primary differential member 62 after it has been positioned under control of the depressed amount key 29, and prior to its return movement to zero position. Return movement of the primary differential member 62 rotates the selected totalizer wheels in an additive direction a distance commensurate with the positioning of said primary member, under influence of the depressed amount key, to enter in said selected totalizer wheels the value of said depressed key. After the primary differential member 62 has been returned to zero, or home, position by the leading rod 71, the clutch pinion 76 is disengaged from the differential members and is moved into engagement with a corresponding alining tooth 77 formed on an arm 78 secured on a shaft 79 supported in the machine framework, to retain the teeth of said clutch pinion 76 in proper engaging relationship with the teeth in the peripheries of the primary and secondary differential members 62 and 63.

Each amount bank is provided with a zero stop bar 70 (Fig. 3), which functions, when no amount key 29 is depressed, to retain the primary differential members 62 in zero position and thus makes it unnecessary to have zero keys.

The zero stop bar 70 for the amount bank being described is slidably supported in a slot in the key frame 49 and is urged inwardly by a spring 80, tensioned between said zero stop bar and a stud in said key frame. Normally, the zero stop bar 70 is retained out of the path of the projection 61, as here shown in full lines, by an arm (not shown) which is operatively connected to the arm 66. Releasing movement clockwise of the arm 66, at the beginning of machine operation, as explained before, permits the zero stop bar 70 to move inwardly from its full-line position to its dot-and-dash position (Fig. 3), where it is directly above and in the path of the projection 61, to retain the primary differential member 62 in zero position, when no amount key 29 is depressed.

Depression of an amount key 29 causes the pin 53 therein, in cooperation with a corresponding camming projection 81 on a control plate 82, rockably supported at its upper end by a link, similar to the link 56, and at its lower end by an arm 83, to shift said control plate downwardly, or clockwise, against the action of a spring 84. This rocks the arm 83 also clockwise, causing a slot in the inner end thereof to move over a stud 85, secured in the zero stop bar 70, to latch said bar in its outward, full-line, position, out of the path of the projection 61 on the primary differential member 62, so that said differential member may be positioned under control of the depressed amount key 29.

In sub-total-taking and total-taking operations, often referred to as read and reset operations, the selected totalizer wheel 44, 45, or 46 on the No. 1 or No. 2 totalizer line is engaged with the teeth in the primary differential member 62 prior to its initial movement, which movement reversely rotates said selected wheel to zero position, as determined by a long tooth on said wheel coming into engagement with a zero stop mechanism, to position the primary differential member 62 in accordance with the value stored on said selected totalizer wheel. In resetting operations, the selected totalizer wheel is disengaged from the primary differential member 62 prior to its return movement, and consequently said wheel remains in a zeroized condition. In reading operations, the selected totalizer wheel remains in engagement with the primary differential member during its return movement and is restored to its original position, to reenter the value therein.

Mechanism (not shown), operated by the total control lever 39 (Fig. 1) when it is moved to Read or Reset Row 1 or to Read or Reset Row 2 positions, retains the zero stop bar 70 (Fig. 3) in its outward, ineffective, position, so that the primary differential member 62 is free to be positioned under control of the selected totalizer wheel 44, 45, or 46, as explained above.

*Amount transmission mechanism*

The positioning of the secondary differential member 63 in adding, reading, and resetting operations is transmitted to the corresponding amount indicator 47 and to the corresponding type wheels (not shown) through the medium of a transmission mechanism comprising internal-external transmission gears and their corresponding pinions and square transmission lines, in a manner well known in the art.

Gear teeth in the periphery of the secondary differential member 63 (Fig. 3) mesh with similar teeth in a gear 87 free on a shaft 88 supported by the main framework of the machine, said gear in turn meshing with teeth in a corresponding internal-external transmission gear 89, the internal teeth of which rotatably engage the periphery of a corresponding disk 90, in turn supported by a shaft 91 mounted in the machine framework.

Teeth in the periphery of the gear 89 mesh with and drive a gear 92 integral with a pinion 94, said gear and said pinion being free on a shaft 93 supported in the machine framework. The pinion 94 meshes with gear teeth in a segmental portion of an indicator positioning segment 95 free on the shaft 91, said segment having teeth which in turn mesh with a pinion 96 connected to the corresponding amount indicator 47 by a shock-absorbing spring device. Through the train of gearing described above, the secondary differential member 63 is operatively connected to the corresponding amount indicator 47 and positions said indicator in accordance with its own positioning, to indicate the values in adding, reading, and resetting operations.

The internal teeth of the transmission gear 89 (Fig. 3) mesh with and drive a pinion 97 fast on a square transmission shaft 98 journaled in corresponding holes in the disks 90 for the various denominational orders, said shaft 98 in turn carrying other pinions 97, which mesh with internal teeth of other transmission gears which are geared to corresponding type wheels (not shown) and position said type wheels in accordance with the positioning of the secondary differential members 63 in adding and total-taking operations.

An aliner 99 (Fig. 3) coacts with the teeth of the pinion 96 to aline the indicator 47 in set position, and an aliner bar 100 coacts with alining teeth in the transmission gear 89, to aline said transmission gear and connected parts after they have been positioned under control of the secondary differential member and during operation of the impression mechanism. The impression mechanism then functions to print records of the values set up on the amount keys 29 in adding operations, and amounts taken from the totalizer wheels 44, 45, and 46 in total-taking operations, upon suitable record material, such as a detail strip, a receipt strip, or an insertable slip.

The indicator aliner 99, for the denominational order being described, and a spring arm 102 are secured on a shaft 101 journaled in the indicator framework. A spring 103, tensioned between the arm 102 and a stationary stud, urges said arm, the shaft 101, and the aliner 99 counter-clockwise to normally maintain the tooth of said aliner in yielding engagement with the teeth of the pinion 96, to retain the indicator 47 in set position. Also fast to the shaft 101 is a crank 104 pivotally connected by a link 105 to a bell crank 106 free on a rod 107 supported in the machine framework, said bell crank in turn being connected to and operated by a corresponding plate cam (not shown) secured on the main cam shaft 68. Operation of the main cam shaft 68 causes the aliner 99 to be rocked out of engagement with the pinion 96, against the action of the spring 103, at the beginning of machine operation, to free the indicator 47 for positioning under control of the differential mechanism, and, after said indicator has been positioned, the aliner 99 is returned into engagement with the pinion 96 to retain said indicator in set position.

The aliner bar 100 (Fig. 3) is supported on three similar arms 108 (only one shown) secured on a shaft 109 journaled in the machine framework. Also secured on the shaft 109 is a crank 110, pivotally connected by a link 111 to one arm of a bell crank 112 free on the rod 107. The other arm of the bell crank 112 is pivotally connected by a link 113 to a cam lever 114 free on the shaft 73 and carrying rollers 115 and 116, which coact, respectively, with the peripheries of companion plate cams 117 and 118, secured on the main cam shaft 68. After the transmission gear 89 (Fig. 3) has been positioned under control of the amount differential mechanism, the cams 117 and 118 cause the aliner bar 100 to be engaged with the alining teeth in said transmission gear to secure it and connected mechanism in set positions. Near the end of machine operation, after the printing mechanism has functioned, and after the wheels of the selected totalizer have been disengaged from the primary differential member, the cams 117 and 118 disengage the aliner bar 100 from the teeth of the transmission gear 89, and said cams are assisted in such disengagement by a spring 119, which also yieldingly maintains the alining bar 100 in fully disengaged position, so that the alining teeth in the transmission gear 89 will not nibble on it.

*Interlock between amount keys and total control lever*

A locking mechanism is provided for locking the total control lever 39 (Figs. 1 and 10) against movement out of Register position when one of the amount keys 29 (Fig. 3) is depressed, and, conversely, movement of the total control lever 39 out of Register position locks the amount keys against depression.

The total control lever 39 (Fig. 10) is rotatable on the shaft 64 and has a cam slot 121 engaged by a stud 122 in the upper end of a lever 123 free on a stud 124 secured in the left main frame. A downward finger on the lever 123 extends in the path of and cooperates with a stud 125 in the upper end of an arm 126 free on the shaft 65. The arm 126 is connected to a companion arm 129 (Fig. 6), also free on the shaft 65, by parallel rods 127 and 128 extending between and secured to enlarged downward portions of said arms 126 and 129, which rods maintain said arms in fixed and properly spaced relationship to each other on said shaft 65. A spring 130 (Fig. 6) urges the arm 129, the rods 127 and 128, and the arm 126 (Fig. 10) clockwise, causing said arm 126, through the stud 125, to urge the lever 123 counter-clockwise to normally maintain the stud 122 in yielding engagement with the outer edge of the cam slot 121 in the total control lever 39. Also free on the shaft 65, and secured to the rods 127 and 128, is a locking arm 131 (Fig. 6) for each amount bank, the upper end of each arm 131 coacting with a downward extension 132 of the corresponding control plate 82 (see also Fig. 3).

Figure 10:
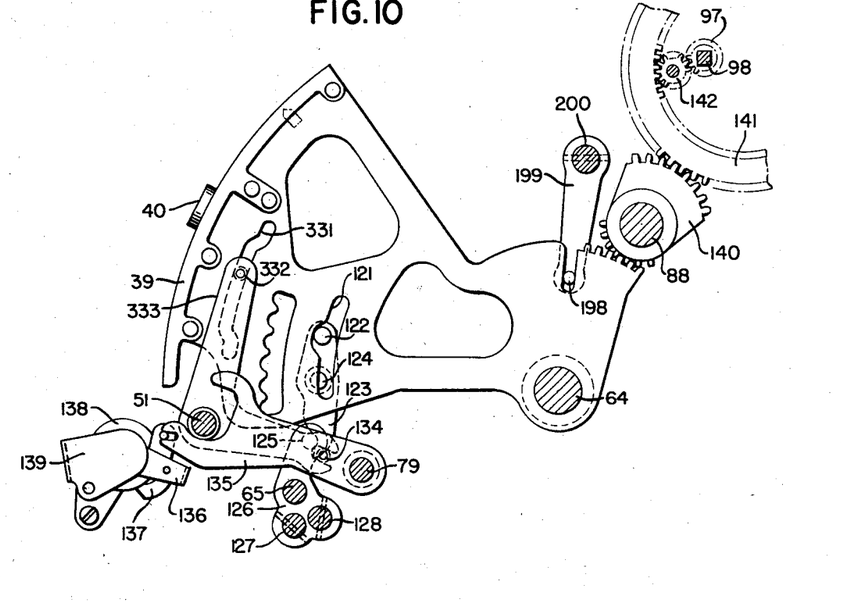
Fig. 10 is a right side elevation of the total control lever, sometimes referred to as the "Unit Lock Lever," for controlling the functions of the two lines of totalizers.

As previously explained, depression of an amount key 29 shifts the control plate 82 downwardly, or clockwise, and this moves the extension 132 into the path of the upper end of the corresponding arm 131 to obstruct counter-clockwise movement of said arm, the rods 127 and 128, and the companion arm 126 (Fig. 10). The stud 125 in the arm 126 obstructs clockwise movement of the lever 123; consequently the stud 122 in its upper end is held in engagement with a recess in the slot 121 to secure the total control lever 39 in Register position, when an amount key is depressed.

Movement of the total control lever 39 out of Register position causes the slot 121, in cooperation with the stud 122, to rock the lever 123 clockwise, said lever in turn rocking the arm 126, the rods 127 and 128, and the arm 129 counter-clockwise, against the action of the spring 130. This moves the upper ends of the arms 131 into the paths of their corresponding extensions 132 on the control plates 82 to obstruct downward movement of said plates, to prevent depression of an amount key 29 when the total control lever 39 is out of Register position.

*Reset counter*

While not pertinent to the present invention, a brief description will be given of the reset counter, which accumulates "1" each time the total control lever 39 (Fig. 10) is moved to either Reset Row 1 or Reset Row 2 position.

Movement of the total control lever 39 to either Reset Row 1 or Reset Row 2 position causes a cam slot 331 therein, in cooperation with a stud 332 in the upper end of an arm of a bell crank 333, free on the rod 51, to rock said bell crank clockwise (Fig. 10). During its clockwise movement, a slot in a rearward arm of the bell crank 333, in cooperation with a stud 134 in a reset counter operating arm 135 free on the shaft 79, rocks said arm 135 counter-clockwise. During its counter-clockwise movement, a slot in a forward extension of the arm 135, in cooperation with a stud in an extension of a yoke 136 free on a shaft supported in a bracket 139 secured to the machine framework, rocks said yoke clockwise. The yoke 136 carries a feed pawl 137 having the usual graduated teeth, which coact with the teeth of corresponding ratchets carried by each of several reset counter wheels 138 free on the shaft which supports the yoke 136. The teeth of the pawl 137 are maintained in feeding engagement with the counter wheel ratchets by a torsion spring (not shown), and clockwise movement of the yoke 136, as explained above, causes said pawl to advance the units counter wheel 138 one step each time the total control lever 39 is moved to Reset Row 1 or Reset Row 2 position.

When the units order wheel 138 of the reset counter passes through zero, a deep notch in the ratchet for said wheel permits the pawl 137 to move inwardly and engage the teeth of the ratchet for the adjacent higher order wheel to transfer "1" from said lower order to said adjacent order, as is usual with this type of step-by-step counter. Retaining pawls (not shown) coact with the teeth of the ratchets for the counter wheels 138 to properly locate said wheels so that the numerals thereon are visible through a suitable window or opening in the machine case 27, and to prevent retrograde movement of said counter wheels 138 upon counter-clockwise take-up movement of the pawl 137 and the yoke 136, when the total control lever 39 is moved out of Reset Row 1 or Reset Row 2 position.

The function of the machine being controlled by the total control lever 39 is recorded upon the record material by suitable type wheels (not shown), which are positioned when said control lever is moved to its various positions.

Teeth on a segmental portion of the total control lever 39 (Fig. 10) mesh with corresponding teeth in a segment 140, free on the shaft 88, said segment having thereon other teeth which mesh with teeth in the periphery of an internal-external transmission gear 141, similar to the gear 89 (Fig. 3). Internal teeth in the transmission gear 141 mesh with and drive a pinion 142, which in turn meshes with and drives a pinion 97 on one of the square shafts 98. Other pinions on said shaft 98 mesh with and drive corresponding transmission gears, which transmit the positioning of the lever 39 to corresponding type wheels to record the function being controlled by said total control lever 39.

Counter-clockwise rocking of the arms 126, the rods 127 and 128, and the arm 129, when the total control lever 39 is moved out of Register position (Figs. 6 and 10), as explained above, retains the zero stop bars 70 for the amount banks (Fig. 3) in ineffective positions, as shown in full lines, so that the corresponding primary differential members 62 are free to be positioned under control of the selected set of totalizer wheels in reading and resetting operations.

*Totalizers*

The lower, or No. 1, totalizer line 42 is similar in construction to the totalizer line disclosed in the application Serial No. 341,633, referred to before, and therefore will be only briefly described herein.

As previously stated, each denominational order of the lower, or No. 1, totalizer (Fig. 2) comprises four group totalizer wheels 44, corresponding to the Row 1 control keys 30 to 33 inclusive, and one item totalizer wheel 45, which latter wheel accumulates items entered under control of the Row 2 control keys 35 in multiple-item transactions. The wheels 44 and 45 of the No. 1 totalizer line are rotatably supported on a sleeve free on a shaft 143 mounted in a totalizer framework shiftably supported between right and left totalizer frames 144 and 145, in turn secured to the right and left main frames 25 and 26. The No. 1 totalizer supporting sleeve has therein an annular groove engaged by the tines of a shifting fork 146 rotatably supported on a shifting rod 147 in turn mounted in the frame 144 and 145. Collars and sleeves secured to the rod 147 retain the shifting fork 146 against lateral movement on said shaft.

Secured on the right-hand end of the rod 147 (Fig. 2) is a shifting block 148 with a downward extension, which is slotted to snugly embrace an undercut portion of a stud 149 secured in the frame 144, said stud acting to prevent rotational movement of said block and the rod 147. The shifting block 148 carries a roller which engages a helical shifting groove in a drum cam 150 rotatably mounted on a stud secured in the frame 144.

Mechanism not shown here, but fully disclosed in the application Serial No. 341,633, is operated by depression of the Row 1 control keys 30 to 33 inclusive, to position the drum cam 150 accordingly, causing said cam in turn to shift the rod 147 to aline the corresponding set of totalizer wheels 44 with the primary differential members 62 for actuation thereby. When the lever 39 is in Register position, the totalizer wheels 44 selected by the keys 30–33 are engaged with and disengaged from the primary differential members in add timing, to enter therein the value set up on the amount keys 29. Movement of the total control lever 39 to Read Row 1 or Reset Row 1 position causes the totalizer wheels 44 selected by the keys 30–33 to be engaged with and disengaged from the primary differential members in reading and resetting time, respectively, to ascertain and record the values stored in said selected totalizer wheels. In reading operations, the selected totalizer wheels remain in engagement with the primary differential members during their return movement and, consequently, are restored to their original positions, while in resetting operations said selected wheels are disengaged from said primary differential members prior to their return movement and, consequently, remain in a zeroized condition.

*No. 2 totalizer selecting mechanism*

The upper, or No. 2, totalizer line 43 (Figs. 1, 2, and 3) has nine totalizer wheels 46 for each denominational order, corresponding to the five item keys 35 and to the four clerks' keys 37, in Row 2. Depression of the Row 2 control keys 35 and 37 operates mechanism which shifts the No. 2 totalizer line horizontally to aline the set of totalizer wheels 46 corresponding to the depressed control key 35 or 37 with the primary differential members 62 for actuation thereby.

The Row 2 control keys 35, 36, and 37 are slidably mounted in corresponding slots in a control bank frame 151 (Fig. 4) supported by the rods 50 and 51. Each of the stems of the keys 35, 36, and 37 is encircled by a corresponding compressible spring, not shown but similar to the springs 52 (Fig. 3) for the amount keys, which urge said keys outwardly to normal, undepressed, position. Each of the keys 35 has a pin 152, each of the keys 37 has a pin 153, and the key 36 has a pin 157, which pins extend through slots in the frame 151 and coact with corresponding hooks 282 formed on the outer edge of a Row 2 flexible detent 283 rockably mounted in the control frame 151, through the medium of an upper link (not shown) and a lower arm 284 free on a stud 285 in said frame 151, said link and said arm 284 being similar in outline and function to the link 56 and the arm 57 (Fig. 3) for the amount keys. A spring (not shown) urges the detent 283 upwardly, or counter-clockwise, to normally maintain camming surfaces formed on the hooks 282 in yielding engagement with the corresponding pins 152, 153, and 157.

Depression of a Row 2 control key 35, 36, or 37, against the action of its spring, causes the pin 152, 157, or 153 to engage the camming surface on the corresponding hook 282 and rock the detent clockwise, or downwardly. When the pin 152, 157, or 153 moves beyond the shoulder formed on the hook 282, the detent 283 is spring-returned upwardly a slight distance to latch said shoulder over said pin, to retain the key 35, 36, or 37 depressed. Near the end of machine operation, counter-clockwise restoring movement of the key release shaft 65 (Fig. 4) and an arm 286, fast on said shaft and similar to the arm 66, causes the forward edge of said arm 286 to engage a roller 287, carried by the arm 284, and rock said arm and the detent 283 clockwise. This disengages the hook 282 from the pin of the depressed key 35, 36, or 37 to free said key for restoring movement to undepressed position, by its spring. A curved downward extension of the arm 284 coacts with a bent-over ear on the arm 286 to obstruct releasing movement clockwise of said arm 286 and the shaft 65 when a key 35, 36, or 37 is partially depressed and to lock said keys against release or depression upon releasing movement of said arm 286.

The pins 152 and 153 in the keys 35 and 37 coact, respectively, with corresponding camming slots or notches 154 and 155 in a No. 2 totalizer shifting segment 156 rotatably supported on the shaft 64. The pin 157 in the Sub-Total key 36 coacts with a camming notch 158 in the segment 156 for the purpose of holding said segment stationary when said Sub-Total key is depressed, and not for selecting a totalizer on the No. 2 totalizer line.

Figure 2:
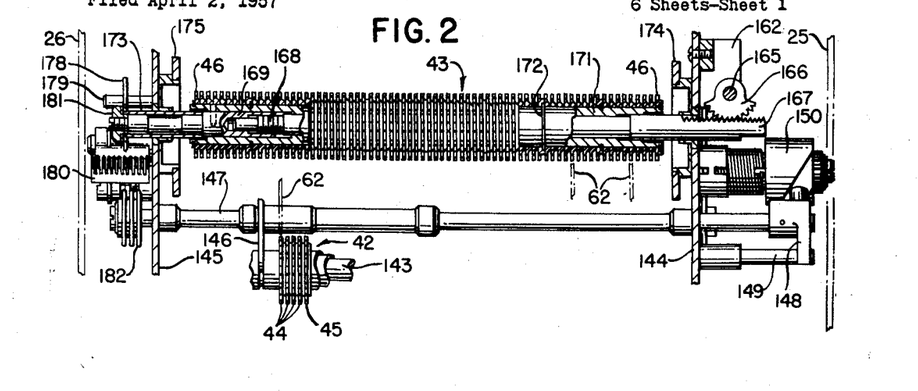
Fig. 2 is a longitudinal view, as observed from the front of the machine, showing the upper and lower totalizer lines and the shifting mechanism therefor.

A rearward extension 159 of the segment 156 has gear teeth which mesh with a gear 160 (Figs. 4 and 5) free on a stud 161 fast in a bracket 162 secured to the right totalizer frame 144 (Fig. 2). Integral with the gear 160, and free on the stud 161, is a segmental bevel gear 163, the teeth of which mesh with a bevel pinion 164 secured on the outer end of a short shaft 165 journaled in arms of the bracket 162. Secured on the shaft 165, between parallel arms of the bracket 162, is a wide faced shifting segment 166, having teeth which mesh with rack teeth formed on the right-hand end of a shifting rod 167 for the No. 2 totalizers. The rod 167 extends substantially through a central boring in a sleeve 171, which rotatably supports the No. 2 totalizer wheels 46, said wheels 46 being retained in proper place on said sleeve by a collar secured to its right end, and by a plurality of split washers 172, which engage annular grooves in said tube and are held in said grooves by counterbores in the hubs of the adjacent totalizer wheels 46. A threaded tenon 168 formed near the left end of the rod 167 engages a threaded boring in a trunnion stud 169 secured in the left end of the boring in the sleeve 171, said trunnion stud being freely engaged by an aliner bushing 173.

The No. 2 totalizer line assembly, which comprises the rod 167, the sleeve 171, the trunnion 169, and the bushing 173, is shiftable horizontally in bushings in a No. 2 totalizer framework comprising similar right and left plates 174 and 175 (Figs. 2 and 8), said plates in turn being shiftably mounted, respectively, on the inside surfaces of the frames 144 and 145. The bushings in the plates 174 and 175, which shiftably support the No. 2 totalizer line, extend through slots in the totalizer frames 144 and 145 (Fig. 8), and said plates 174 and 175 support a shaft 176, which engages corresponding slots in the frames 144 and 145, to form a support for the No. 2 totalizer line which is shiftable angularly, so that the selected totalizer wheels 46 may be engaged with and disengaged from the teeth in the corresponding primary differential members 62 for actuation thereby.

Secured to the outer end of the bushing 173 (Fig. 2) is an aliner bar 178 (Fig. 2) having a slot which engages a stud 179 secured in the frame 145 to hold said aliner against rotational movement, but to permit sliding movement of said aliner when the No. 2 totalizer wheels are engaged with and disengaged from the primary differential members. A tooth formed on the aliner 178 is arranged to be engaged by tooth spaces formed in an aliner comb 180, to retain the selected set of totalizer wheels 46 in alinement with the primary differential members 62 during engaging and disengaging movement of said totalizer wheels. A nut 181 (Fig. 2), which threads onto the outer end of the trunnion stud 169, provides means for adjusting the totalizer wheels 46 in relation to the primary differential members 62 and the aliner mechanism 178 and 180, to insure that the selected set of totalizer wheels is in proper engaging relationship with said differential members. A screw slot is provided in the threaded outer end of the trunnion 169 for turning said trunnion and the sleeve 171, and, as the shifting rod 167 is retained stationary, the threads 168 provide means for adjusting said sleeve and the totalizer wheels 46 in relation to said rod 167, to properly aline said totalizer wheels with the primary differential members. After the adjustment has been completed, the nut 181 may be tightened to retain the trunnion 169 and the sleeve 171 in adjusted positions.

Alining mechanism similar to that for the No. 2 totalizer line is provided for the No. 1 totalizer line, for properly alining the selected set of totalizer wheels 44 or 45 with the primary differential members 62.

Secured on the left-hand end of the No. 1 shifting rod 147 (Fig. 2) are three similar and equally spaced alining disks 182, arranged to be engaged by the several teeth of an alining arm (not shown) for accurately locating the selected set of totalizer wheels on the No. 1 line with the primary differential members 62, during the time that said selected set of totalizer wheels is being engaged with and disengaged from said primary differential members.

A homing mechanism is provided for returning the shifting segment 156 (Fig. 4) for the No. 2 totalizer line to and retaining it in a central position, in which the fifth, or central, set of totalizer wheels 46, corresponding to the (E) clerk's key 37, is maintained in alinement with the primary differential members 62 to equalize and lessen the shifting movement required to manually shift said No. 2 totalizer line. This provides a simple and effective means for selecting the nine sets of totalizer wheels on the No. 2 totalizer line without the danger of mechanical and operational difficulties which would be involved in the shifting of said No. 2 line from one extreme position to another.

The shifting segment 156 (Fig. 4) has a homing aperture 183 engaged by a roller 184 mounted on the upper end of an arm 185 free on the shaft 79. A spring 187, tensioned between the arm 185 and a companion arm 186, free on the shaft 79, urges said arms toward each other to normally maintain a stop stud 188, carried by said arm 186, in yielding engagement with a shoulder formed on the lower end of said arm 185. Tensioned between the arm 185 and an extension 189 of a clutch pinion alining arm 190, fixed on the shaft 79, is another spring 191, which urges said arm 185 counter-clockwise to normally maintain the roller 184 in yielding engagement with a V depression formed in the forward portion of the homing aperture 183, to normally maintain the segment 156 in a central position, in which the pin 153 of the (E) clerk's key 37 is in alinement with its camming slot 155 in the periphery of said segment 156. This central positioning of the segment 156, through the gearing connecting said segment to the No. 2 totalizer line shifting segment 166 (Figs. 2 and 4), causes said segment, in cooperation with the rack teeth on the right end of the shifting rod 167, to position said rod, the sleeve 171, and the totalizer wheels 46 as shown here, to aline the set of totalizer wheels corresponding to the (E) clerk's key 37 with the primary differential members 62 for actuation thereby.

Depression of the (D) clerk's key 37 causes the pin 153, carried by said key, in cooperation with its angular camming slot 155, to shift the segment 156 from its central position full distance counter-clockwise, which movement causes the segment 166 (Fig. 2) to shift the No. 2 totalizer line to its extreme left hand position, in which the set of wheel 46 corresponding to said (D) clerk's key is in alinement with the primary differential members 62. Counter-clockwise movement of the segment 156 causes the angular camming portion of the aperture 183, in cooperation with the roller 184, to rock the arm 185 and, through the spring 187, the companion arm 186 clockwise, to move a foot-shaped forward extension of said arm 186 into the path of a roller 192 carried by the arm 286, as shown in dot-and-dash lines in Fig. 4. Clockwise movement of the arm 185 likewise tensions the spring 191. The detent 283 (Fig. 4) retains the (D) clerk's key 37 depressed during operation of the machine, and consequently the segment 156 is held in its extreme counter-clockwise position by the pin 153, until said (D) clerk's key 37 is released, near the end of machine operation, by counter-clockwise restoring movement of the key lock and release shaft 65 and the arm 286, as explained above. Counter-clockwise restoring movement of the arm 286 (Fig. 4) causes the roller 192, in cooperation with the foot-shaped extension of the arm 186, to rock said arm counter-clockwise independently of its companion arm 185 to apply additional tension to the spring 187 for assisting the spring 191 in imparting maximum restoring power, counter-clockwise, to said arm 185. This causes the roller 184, coacting with the camming surfaces formed in the aperture 183, to restore the segment 156 from its extreme counter-clockwise position to its central, or normal, position, as shown here. Release of the depressed (D) clerk's key 37 to the action of its restoring spring, as explained earlier, causes the stud 153, in cooperation with the angular camming portion of the camming slot 155, to assist the arm 185 in restoring the segment 156.

Depression of the (I) item key 35 (Figs. 1 and 4) causes the pin 152 therein, in cooperation with the angular camming slot 154, to rock the segment 156 clockwise from its central, or normal, position to its extreme clockwise position, to aline the set of wheels on the No. 2 totalizer line corresponding to said key 35 with the primary differential members 62.

Figures 4, 5:
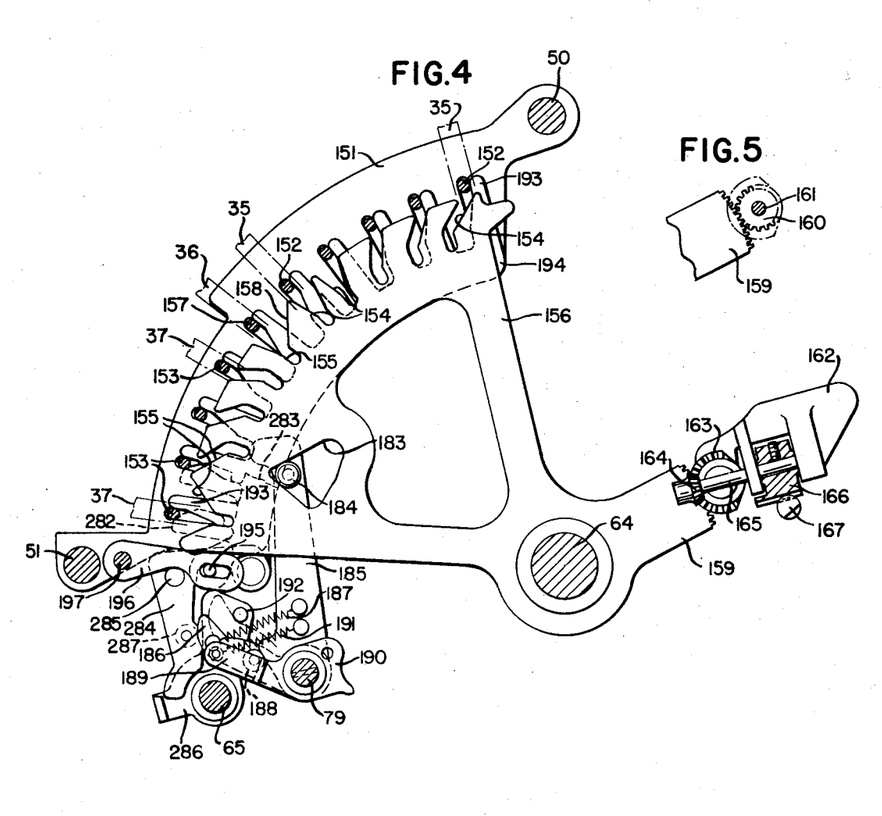
Fig. 4 is a right side elevation of the mechanism for shifting the No. 2, or upper, totalizer line to selectively aline the different sets of totalizers thereon with the amount actuators.
Fig. 5 is a fragmentary view of a portion of the mechanism shown in Fig. 4.

It will be noted, by observing Fig. 4, that the three item keys 35 imparting the most throw to the segment 156 have closed camming slots 154, so that restoring movement upwardly of said keys will assist in restoring said segment 156 to its central position. This is also true of the three clerks' keys 37, which impart the greatest degree of counter-clockwise positioning movement to the segment 156. It will be recalled that the (E) key 37 imparts no movement to the segment 156 upon depression, as said segment's central, or normal position, as shown in Fig. 4, alines the wheels 46 of the No. 2 totalizer corresponding to this clerk's key with the primary differential members. Likewise it will be remembered that the notch 158 is in alinement with the pin 157 of the Sub-Total key 36, so that depression of said key imparts no movement to the segment 156 but acts to secure said segment in its central position. As there is no set of totalizer wheels on the No. 2 totalizer line corresponding to the Sub-Total key 36, no engaging and disengaging movement is imparted to said line in item sub-total operations.

The cam slots 154 for the (IV) and (V) item keys 35 are open slots, and consequently, the restoration of these keys does not assist in returning the segment 156 to its central position, as the action of the arm 185 is ample for restoring said segment in this case, due to the small degree of movement imparted to said segment by said keys 35. Likewise the slots 155 and 158 for the (E) clerk's key 37 and the Sub-Total key 36 are open, as the segment 156 remains in its central position in this case and therefore requires no restoring movement.

The homing mechanism described above for restoring the segment 156 to a central position midway between the two extremes of its selecting movement in opposite directions makes it practical to use a simple, direct, and economical manually operated means for selecting the nine sets of interspersed totalizer wheels 46 on the No. 2 totalizer line.

Return movement of the shaft 65 and the arm 286 from their fully restored position to normal position, as shown in Fig. 4, withdraws the roller 192 from the foot of the arm 186 to remove the extra tension from the spring 187 and thus reduce the spring load on the arm 185 and the segment 156, to provide comparatively easy action for the No. 2 control keys when they are depressed to select the corresponding No. 2 totalizer.

The pins 152, 153, and 157, in the No. 2 control keys 35, 37, and 36, coact with corresponding camming fingers 193 formed on the periphery of a slide 194 slidably supported in the frame 151. The lower end of the slide 194 carries a stud 195, which engages a slot in an arm 196 free on a stud 197 in the frame 151. The arm 196 is connected to mechanism (not shown) for controlling the operation of the impression mechanism for the detail strip, and, in the present arrangement, depression of any one of the No. 2 control keys shifts the slide 194 upwardly, or clockwise, to rock the arm 196 counter-clockwise to disable the impression mechanism, so that data relating to operations controlled by said No. 2 control keys will not be recorded on said detail strip.

Movement of the total control lever 39 (Fig. 10) to Read Row 1 or Reset Row 1 position locks all of the control keys in Row 2 against depression, and movement of said total control lever to Read Row 2 or Reset Row 2 position locks the item Sub-Total key 36 against depression, to effect proper control of the functions of the No. 2 totalizers by said total control lever.

Movement of the total control lever 39 (Figs. 1, 10, and 11) to Read Row 1 or Reset Row 1 position causes a slot therein, in cooperation with a stud 198 in a crank 199 secured on a shaft 200, journaled in the machine framework, to rock said crank and said shaft clockwise. Clockwise movement of the shaft 200 and a crank 201, secured thereon, causes a stud in said crank, in cooperation with a stud 202 in an arm 203 free on the shaft 88, to rock said arm 203 counter-clockwise. Counter-clockwise movement of the arm 203 causes a stud 204 carried thereby, in cooperation with a cam slot 205 in a control segment 206 free on the shaft 64, to rock said segment also counter-clockwise. Counter-clockwise movement of the segment 206 moves fingers 207, formed on its periphery, into the path of the pins 152 in the item keys 35, the pins 153 in the clerks' keys 37, and the pin 157 in the Sub-Total key 36, to obstruct depression of all Row 2 control keys when the total control lever is moved to Read Row 1 or Reset Row 1 position.

Figure 11:
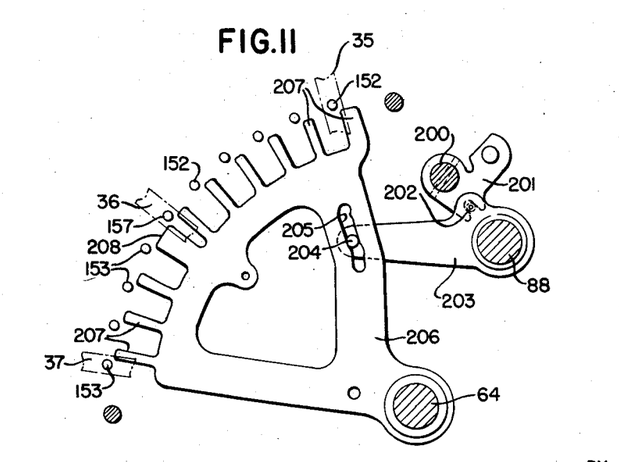
Fig. 11 is a detail view, as observed from the right, of the locking plate operated by the total control lever for controlling the depression of the Row 2 control keys.

Movement of the total control lever 39 to Read Row 2 or Reset Row 2 position rocks, through the mechanism described above, the arm 203 clockwise (Fig. 11), causing the stud 204, in cooperation with the cam slot 205, to rock the segment 206 also clockwise to move a wide finger 208 into the path of the pin 157 in the Sub-Total key 36, to obstruct depression of said key when said total control lever is so positioned. When the total control lever 39 is in Register position, as shown in Fig. 10, the segment 206 is positioned as shown in Fig. 11, in which position the fingers 207 and 208 are out of the paths of the pins in the No. 2 control keys and consequently do not interfere with the depression of said keys at this time.

It is obvious that the fingers 207 and 208 may be arranged in any suitable order, so as to obtain the desired control of the depression of the No. 2 control keys by the total control lever 39. It is likewise conceivable that as many of the fingers 207 and 208 as required may be omitted to obtain additional control of depression of the No. 2 control keys.

*No. 2 totalizer engaging mechanism*

The engaging mechanism for the No. 2 totalizer line is similar to that disclosed in the application Serial No. 341,633, but nevertheless will be briefly described herein.

As previously explained, the No. 2 totalizer line is mounted in a totalizer framework 174 and 175, shiftably supported between the totalizer frames 144 and 145, on the shifting rod 167 (Figs. 2 and 8) and the trunnion 169, in cooperation with corresponding slots in said frames 144 and 145, and by means of the shaft 176, opposite ends of which engage corresponding slots in said frames 144 and 145. Opposite ends of the shaft 176 (Fig. 8) have mounted thereon rollers engaged by slots in shifting arms 210 and 211 secured on a shaft 212 journaled in the frames 144 and 145. The right-hand arm, 210, has a cam slot 213 engaged by a roller 214 carried by an arm 215 free on a rod 216 supported in the frames 144 and 145, said arm 215 having integral therewith a crank 217. The crank 217 has pivotally connected thereto the upper end of a link 218, the lower end of which is pivotally connected to a bell crank 219 free on a stud 220 supported by the main frame 25 and the totalizer frame 144. Integral with the bell crank 219 is a crank 221 (Fig. 9), said crank and said bell crank supporting a stud 222, which pivotally supports the rear ends of an add engaging pitman 223 and a reset engaging pitman 224, said pitmans being secured in fixed relationship to each other and properly spaced apart by shoulder studs 225 and 226. The add pitman 223 has an enlarged forward end with an opening 227, having a forward control surface which coacts with a shifting stud 228 carried by a lever 229 free on the shaft 73. A spring 230 urges the lever 229 counter-clockwise to normally maintain a roller 231, carried thereby, in yielding contact with the periphery of an add plate cam 232, secured on the main cam shaft 68. The reset pitman 224 (Fig. 9) has an enlarged forward end, with an opening 233, having a forward control surface which coacts with a stud 234 carried by a lever 235 free on the shaft 73. A spring 236 urges the lever 235 counter-clockwise to normally maintain a roller 237, carried thereby, in yielding contact with the periphery of a reset plate cam 238 secured on the main cam shaft 68, said cams 232 and 238 performing one clockwise revolution each machine operation.

The control surfaces in the openings 227 and 233 in the pitmans 223 and 224 (Figs. 8 and 9) are positioned in relation to their corresponding studs 228 and 234 through the medium of a link 240, the lower end of which is pivoted on the stud 225. The upper end of the link 240 (Fig. 6) has a slot 241 freely engaged by a stud 242 in a rearward extension of a control segment 243 free on the shaft 64. The link 240 carries a roller 244 engaged by a slot in the rear end of an arm 245 free on a stud 246 secured in the right machine frame. Integral with the arm 245 is a crank 247 carrying a stud 248, which extends into and coacts with a cam slot 249 formed in a segment 250 free on the shaft 64. An upward extension of the segment 250 is slotted to receive a stud 251 in the lower end of an arm 252 secured on the shaft 200, which shaft, it will be recalled by reference to Fig. 10, is operated by movement of the total control lever 39 to its various positions. A spring 253 (Figs. 6, 8, and 9) urges the link 240 and the pitmans 223 and 224 downwardly, or counter-clockwise, to normally maintain the stud 248 in yielding contact with the outer edge of the slot 249, as shown here.

Figure 8:
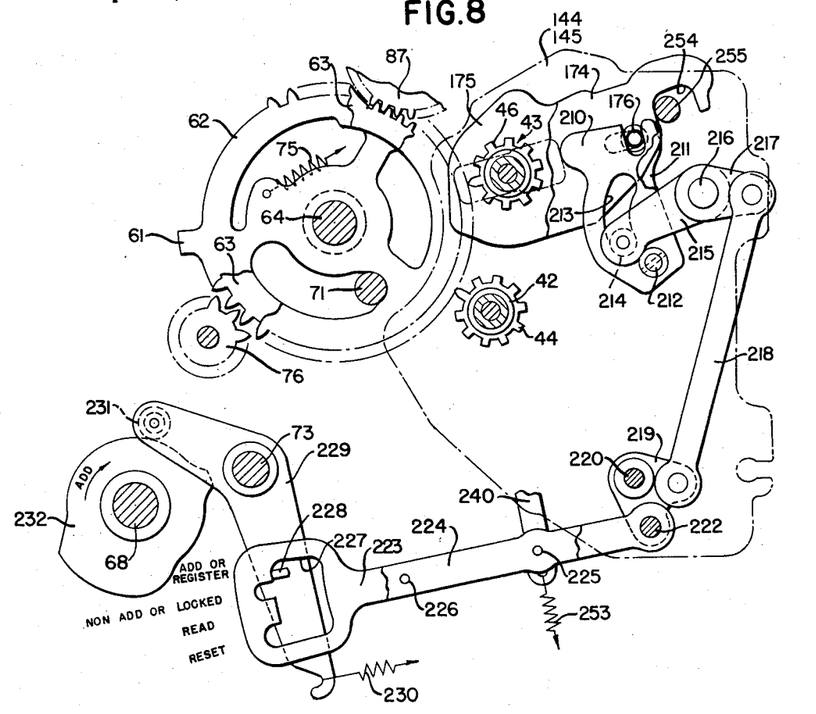
Fig. 8 is a right side elevation of a portion of the mechanism for imparting engaging movement to the No. 2 totalizer line in adding time.
Figure 9:
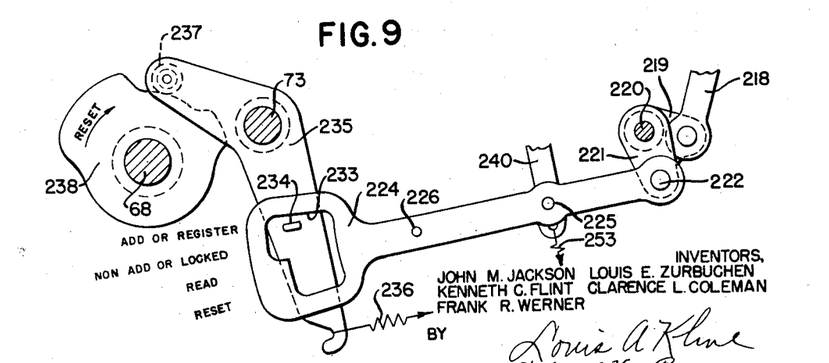
Fig. 9 is a right side elevation of the mechanism for imparting engaging movement to the No. 2 totalizer line in read and reset timing.

When the total control lever 39 is in Register position (Figs. 2, 6, and 10), the segment 250 is positioned as shown in Fig. 6, in which position the slot 249, in cooperation with the stud 248, the crank 247, the arm 245, and the link 240, positions the pitmans 223 and 224 in their extreme downward, or adding, position, as shown in Figs. 8 and 9. Operation of the cams 232 and 238 then causes the studs 228 and 234, in cooperation with the control surfaces on the pitmans 223 and 224, to operate said pitmans, the link 218, and the arm 251 in add timing. The arm 215, through the roller 214, in cooperation with the slot 213, then operates the engaging arms 210 and 211 and the No. 2 totalizer framework in add timing to engage the selected set of totalizer wheels 46 on the No. 2 totalizer line with the primary differential members 62 in add timing.

It should be understood that the cams 232 and 238 impart only engaging movement to the No. 2 totalizer framework, and the usual disengaging mechanism, not shown, but fully disclosed in the applications referred to before, is provided for imparting disengaging movement to said No. 2 totalizer framework.

Movement of the total control lever 39 one step upwardly, or clockwise, from Register position to Locked Register position, rocks the segment 250 one step clockwise, causing the slot 249, in cooperation with the stud 248, to lift the link 240 and the pitmans 223 and 224 (Figs. 8 and 9) approximately one step from add position to Locked Register, or Non-Add, position. Movement of the total control lever 39 to Locked Register, or Non-Add, position also locks the machine against operation, and, as a result, no engaging movement will be imparted to the No. 2 totalizer framework in this instance.

Movement of the total control lever 39 two steps upwardly, or clockwise, to Read Row 2 position, imparts two steps of clockwise movement to the segment 250 (Fig. 6), causing the slot 249 to lift the link 240 and the pitmans 223 and 224 two steps upwardly, or clockwise, to Read position, whereupon operation of the cams 232 and 238 causes the selected set of totalizer wheels 46 on the No. 2 totalizer line to be engaged with the primary differential members 62 in read timing.

Movement of the total control lever 39 upwardly three steps, to Reset Row 2 position, adjusts the segment 250 accordingly, to lift the link 240 and the pitmans 223 and 224 (Figs. 8 and 9) three steps, or full distance, upwardly to Reset position, whereupon operation of the cams 232 and 238 causes the selected set of No. 2 totalizer wheels 46 to be engaged with the primary differential members in reset timing.

Movement of the total control lever 39 (Figs. 2, 6, and 10) downwardly, to either Read Row 1 position or Reset Row 1 position, adjusts the segment 250 accordingly, causing the slot 249, in cooperation with the stud 248, the crank 247, and the arm 245, to lift the link 240 and the pitmans 223 and 224 (Figs. 8 and 9) one step, to Locked Register, or Non-Add, position, so that no engaging movement will be imparted to the No. 2 totalizer line under these conditions.

The No. 2 totalizer is provided with a tens transfer mechanism, which is common to all of the nine sets of totalizer wheels 46 thereon, and said transfer mechanism coacts with said sets of wheels, when they are alined with the primary differential members 62, to transfer tens digits from lower to higher denominations. This tens transfer mechanism is similar in every respect to that disclosed in the application Serial No. 341,633, and, as said tens transfer mechanism has no important bearing upon the present application, it is not disclosed herein and will not be further described.

Each of the plates 174 and 175 (Figs. 2 and 8) has a hook-shaped rearward extension, which forms an opening with opposed walls, which coact with a corresponding stud 255, secured in the frames 144 and 145, to limit the engaging and disengaging movement of said plates and the No. 2 totalizer line, to prevent overthrow of said line in either direction.

Certain of the Row 1 control keys operate mechanism which moves the engaging pitmans 223 and 224 to Locked Register, or Non-Add, position. The link 240 (Figs. 6, 8, and 9) carries a roller 257, which overlies and coacts with a foot-shaped extension 258 on a control segment 259 free on the shaft 64. The control segment 259 has formed on its periphery camming fingers 260, which coact, respectively, with pins 261, 262, and 263, in the Paid-Out key 30, the Charge key 31, and the No-Sale key 34, and with the pin 157 in the Sub-Total key 36. Depression of any one of the control keys referred to above causes the pin therein, in cooperation with the camming finger 260, to rock the segment 259 counter-clockwise. This causes the foot 258, in cooperation with the roller 257, to lift the link 240, against the action of the spring 253, to move the pitmans 223 and 224 upwardly one step, to Locked Register, or Non-Add, position, in which position clearance is provided in the control surfaces on said pitmans for idle operations of the studs 228 and 234, and, consequently, no shifting movement will be imparted to the No. 2 totalizer framework when one of the these keys is depressed.

The Sub-Total key 36, while in the Row 2 position, nevertheless controls the selection of the item totalizer on the No. 1 totalizer line for sub-total, or reading, operations, and it is therefore necessary that this key non-add the No. 2 totalizer line.

Depression of any one of the Row 1 control keys 31, 32, or 34 (Figs. 2 and 6) causes the pin therein, in cooperation with a corresponding camming finger 264, formed on the periphery of the control segment 243, to rock said segment counter-clockwise. This causes a downward extension 265 of the segment 243, in cooperation with a stud 266 in the arm 129 to rock said arm, the rods 127 and 128, and the arms 131 counter-clockwise, against the action of the spring 130, to lock the amount keys 29 (Fig. 3) against depression and to disable the zero stop bars 70, thus permitting the amount differential mechanisms to be positioned under control of the selected set of totalizer wheels on the No. 1 totalizer line. Likewise, depression of the Sub-Total key 36 causes its pin 157, in cooperation with the corresponding finger 264 on the segment 243, to rock said pitman counter-clockwise, to lock the amount keys against depression and to render the zero stop bars ineffective. This frees the amount differential mechanism for positioning under control of the wheels 45 of the item totalizer, to read the amount standing on said wheels.

The counter-clockwise rocking of the segment 243, resulting from depression of the control keys 31, 32, 34, and 36, causes the stud 242 (Fig. 7) to ride idly in the slot 241 in the link 240, and, as a result, the pitmans 223 and 224 remain in add position, as shown in Figs. 8 and 9.

Multiple item transactions comprise one or more item entering operations, controlled by the item keys 35 (Fig. 1), and a final item total operation, controlled either by the Charge key 31 or by the Cash key 32. As usual, an item sub-total operation, controlled by the Sub-Total key 36, may be performed at any time during an item transaction.

In item transactions, the Paid-Out key 30, the Received-On-Account key 33, and the No-Sale key 34, in Row 1 (Figs. 1 and 7), are locked against depression until after the final item total operation has been performed.

A control slide 267, shiftably mounted in the Row 1 framework, has fingers 268, which coact, respectively, with the pins 261 and 263 in the Paid-Out key 30 and the No-Sale key 34, and with a pin 269 in the Received-On-Account key 33. The slide 267 has a curved slot, through which extends a stud 270 in an arm 271 free on a stud secured in the Row 1 framework, said arm having an inward extension 272, which coacts with a stud 273 in an upward extension of a link 274, the upper end of which is pivoted on a stud 275 in a secondary differential member 276 for the Row 1 control keys, said differential member being similar in construction and operation to the secondary differential member 63 (Figs. 3 and 7) for the amount bank, explained previously. The downward end of the link 274 (Fig. 7) is pivotally connected to an arm 277 secured on a shaft 278 journaled in the machine framework. Also secured on the shaft 278 are graduated fingers 279, which coact with feeding pitmans (not shown) for corresponding special counters (not shown), to render said counters effective, depending upon the differential positioning of the secondary member 276, under control of the Row 1 control keys.

Initial movement counter-clockwise of the differential leading rod 71, in the first item entering operation, restores the secondary differential member 276 for the Row 1 control keys to zero position, as shown here. A zero stop bar (not shown), similar to the amount zero stop bar 70, retains the secondary differential member 276 and its companion primary member (not shown) in zero position during subsequent item entering operations. This locates the stud 273, carried by the link 274, directly opposite and in the path of the extension 272 of the arm 271, to obstruct movement of said arm, and consequently the control slide 267 is blocked against upward, or clockwise, movement, thus causing the fingers 268, in cooperation with the pins for the Paid-Out, Received-On-Account, and No-Sale keys to obstruct depression of said keys until an item transaction has been completed.

The Charge key 31 and the Cash key 32 may be depressed at any time during an item transaction, and depression of either of these keys, to initiate the final item total operation of such transaction, renders the zero stop bar for Row 1 ineffective and positions the Row 1 differential members accordingly, and said members remain thus positioned at the end of machine operation. This positioning of the secondary differential member 276 moves the stud 273 out of the path of the extension 272 to free the slide 267, which in turn frees the Paid-Out key 30, the Received-On-Account key 33, and the No-Sale key 34 for depression, to initiate machine operations corresponding thereto.

Like the Charge and Cash keys 31 and 32, the Sub-Total key 36 has no obstructing finger 268 on the slide 267; consequently it is possible to depress said Sub-Total key any time during an item transaction to initiate an item sub-total operation, in which the amount on the item totalizer is read. The Sub-Total key 36 has no effect on the zero stop bar for Row 1; consequently the differential members remain in zero position in item sub-total operations, and the secondary member 276 is still effective to prevent depression of the Paid-Out, Received-On-Account, and No-Sale keys until after the final item total operation has been performed.

It will be noted, by reference to Fig. 6, that the Paid-Out key 30 and the Received-On-Account key 33 do not impart any movement to the control segment 243; consequently, in operations initiated by depression of said keys, it is possible to use the amount keys 29 to set up amounts, and the zero stop bars remain effective in the amount banks in which no amount key is depressed, to position the corresponding differential members at zero.

Mode of operation

Figure 1:
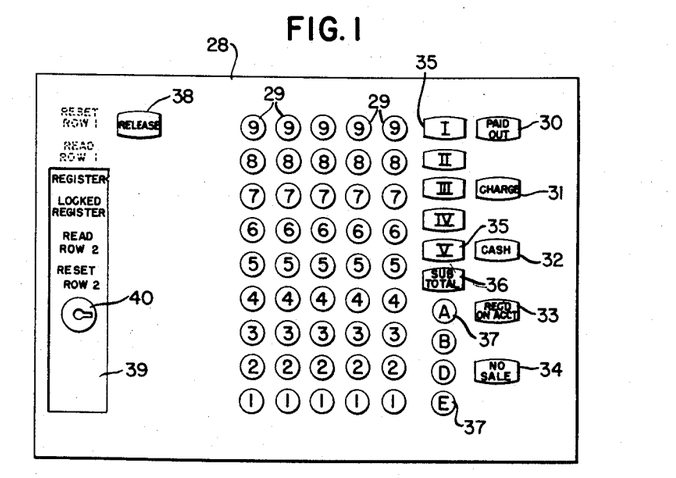
Fig. 1 is a diagrammatic view of a proposed keyboard for the machine embodying the present invention.

It is believed that an understanding of the operation of the machine will have been obtained from a perusal of the preceding description; however, a brief description of operation will be given, using the accounting system of a typical department store as an example, to which system the keyboard arrangement shown in Fig. 1 is ideally suited.

The department store keyboard arrangement, shown in Fig. 1, is primarily for the handling of multiple item transactions, which consist of one or more item entering operations and a final item total operation. As previously explained, the machine has two totalizer lines. The No. 1, or lower, totalizer line has four sets of totalizer wheels thereon, corresponding to the Row 1 control keys 30 to 33 inclusive, and a set of item totalizer wheels, which accumulate the items of a multiple item transaction, under control of the Row 2 item keys 35. The No. 2, or upper, totalizer line has nine sets of totalizer wheels thereon, five of which correspond to the Row 2 item keys 35, and four of which correspond to the Row 2 clerks' keys 37.

Prior to starting a multiple-item transaction, the operator makes sure that the total control lever 39 (Fig. 1) is in Register position, as shown here, after which the amount of the first item is set up on the amount keys 29, and the proper item key 35 is depressed to initiate the first item entering operation of a multiple item transaction.

Additional items of the transaction are entered in the same manner, the proper item keys 35 being used to identify the items and to select the corresponding totalizers on the No. 2 totalizer line to receive amount of the items, and to select the item totalizer on the No. 1 line to accumulate a total of the items of a multiple item transaction. It will be recalled that the keys 35 are what are termed "motorized keys" and initiate machine operation upon being depressed. If at any time during the entering of the items of a multiple item transaction the operator desires to ascertain the total amount of the items entered, the Sub-Total key 36 is used to initiate an item sub-total operation, during which the item totalizer on the No. 1 line is read, or sub-totalized, to record and indicate the amount of the items entered thus far in the item entering operations.

After all the items of a multiple item transaction have been entered, in the manner explained above, the operator initiates the final item total operation of a multiple item transaction by first depressing the proper clerk's key 37 and then the Charge key 31 or the Cash key 32, depending upon whether this is a charge transaction or a cash transaction, and, as said keys 31 and 32 are motorized keys, they initiate operation of the machine. If this is a cash transaction, the Cash key 32 is used to initiate the final item total operation, during which the total amount of the items accumulated in the item totalizer are cleared therefrom and entered in the totalizer on the No. 2 totalizer line corresponding to the depressed clerk's key 37. In the case of a charge transaction, the final item total operation is initiated by depression of the Charge Total key 31 in conjunction with the proper clerk's key 37, and in this operation the item totalizer is cleared to record the total amount of the multiple item transaction. However, the totalizer corresponding to the depressed clerk's key 37 is non-added, in this case, so that only the amounts of cash transactions will be entered in the clerk's totalizers.

As previously explained, the Paid-Out key 30, the Received-On-Account key 33, and the No-Sale key 34 (Fig. 1) are locked against depression during an item transaction. However, the final item total operation frees these keys for use in initiating corresponding operations of the machine. The Paid-Out key 30 and the Received-On-Account key 33 select the corresponding set of totalizer wheels on the No. 1 totalizer line to receive the amounts set up in connection with these operations.

There are no wheels on the No. 1 totalizer line corresponding to the No-Sale key 34, and this key is substantially a recording and indicating key. It will be recalled, by reference to Fig. 6, that depression of this key locks the amount keys 29 against depression, and, conversely, it is impossible to depress the No-Sale key after an amount key has been depressed.

The Release key 38 (Fig. 1) may be used to release any depressed amount keys 29 and clerk's key 37, prior to operation of the machine.

The amounts accumulated in the totalizers on the No. 1 totalizer line and on the No. 2 totalizer line may be read or reset at any time by an authorized person having the proper key to the lock 40 (Figs. 1 and 10), which permits the total control lever 39 to be moved to the corresponding read or reset position. In case it is desired to read the amounts on the No. 1 totalizers, the total control lever 39 is moved to Read Row 1 position, after which the keys 30 to 33 inclusive may be used to select the corresponding totalizers on the No. 1 line for a reading, or sub-total, operation, in which the amounts read from said No. 1 totalizers are recorded upon suitable record material, such as a detail strip, and simultaneously indicated on the amount indicators. If it is desired to sub-total, or read, the amounts on the No. 2 totalizers, the total control lever 39 is moved to Read Row 2 position, after which the keys 35 and 37 may be used to select the corresponding totalizers on the No. 2 totalizer line for a reading, or sub-total, operation, during which the amounts in said selected No. 2 totalizers are recorded upon the detail strip and indicated by the amount indicators.

To reset, or zeroize, the totalizers on the No. 1 totalizer line, the total control lever 39 (Fig. 1) is moved to Reset Row 1 position, after which the keys 30 to 33 inclusive are used to select the corresponding totalizers on the No. 1 line for a resetting operation, during which said corresponding totalizers are zeroized, and the amounts cleared therefrom are recorded upon the record material and simultaneously indicated by the amount indicators. In case it is desired to reset, or totalize, the totalizers on the No. 2 totalizer line, the total control lever 39 is moved to Reset Row 2 position, after which the keys 35 and 37 are used to select the corresponding totalizers on the No. 2 line for a resetting, or zeroizing, operation, during which said corresponding wheels are zeroized, and the amounts contained therein are recorded upon the record material and are simultaneously indicated by the amount indicators.

To render the machine inoperative, the total control lever 39 may be moved to Locked Register position, and an authorized person, having the proper key to the lock 40, may lock said total control lever in said position, so that the machine may not be operated by unauthorized persons.

The description of operation given above of the use of the machine embodying the present invention, in connection with a department store system, is but one example of its use, as said machine is very flexible in nature and may be arranged for use in connection with almost any type of business system involving the sale of items or commodities and the keeping of a record of such sales in a form that is convenient and readily available for future consideration and analysis.

While the form of mechanism shown and described herein is admirably adapted to fulfill the objects primarily stated, it is to be understood that it is not intended to confine the invention to the one form or embodiment disclosed herein, for it is susceptible of embodiment in various other forms, all coming within the scope and the spirit of the invention.

What is claimed is:

1. In a machine of the class described, having a plurality of sets of totalizer elements mounted on a shiftable line and a single set of actuators for the plurality of sets of totalizer elements, the combination of means including a rockable segment to shift the line to aline the different sets of totalizer elements with the actuators; spring-actuated means normally effective to return the segment to and yieldingly retain it in a central position to aline a central or an intermediate set of totalizer elements with the actuators; a depressible selecting key for each set of totalizer elements, each of said keys, when depressed, constructed and arranged to coact with the segment to rock said segment from its central position an extent corresponding to the depressed selecting key to aline the corresponding set of totalizer elements with the actuators; means to hold the depressed selecting key in depressed position to cause the segment to maintain the selected totalizer elements in alinement with the actuators; means effective near the end of machine operation to release the holding means to free the depressed selecting key and the segment for return to undepressed position and central position, respectively; and means operated by the releasing means while operating to release the holding means to momentarily increase the power of the spring-actuated means to insure that the segment is returned to central position.

2. In a machine of the class described, having a plurality of sets of totalizer elements mounted on a shiftable line and a single set of actuators for the plurality of sets of totalizer elements, the combination of means including a rockable segment to shift the line to aline the different sets of totalizer elements with the actuators; spring-actuated means normally effective to return the segment to and yieldingly retain it in a central position to aline an intermediate set of totalizer elements with the actuator; depressible totalizer selecting keys for rocking the segment from said central position in one direction an extent corresponding to the depressed selecting key, to aline the corresponding set of totalizer elements with the actuators; depressible totalizer selecting keys for rocking the segment from said central position in the opposite direction an extent corresponding to the depressed selecting key to aline the corresponding set of totalizer elements with the actuators; means to hold the depressed selecting key in depressed position to cause the segment to maintain the selected set of totalizer elements in alinement with the actuators; means effective near the end of machine operation to release the holding means to free the depressed selecting key and the segment for return to undepressed position and central position, respectively; and means operated by the releasing means while operating to release the holding means to momentarily increase the power of the spring-actuated means to insure that the segment is returned to central position.

3. In a machine of the class described, having a plurality of sets of totalizer elements mounted on a shiftable line and a single set of actuators for the plurality of sets of totalizer elements, the combination of means including a rockable segment to shift the line to aline the different sets of totalizer elements with the actuators; means including a spring-loaded member coacting with the segment to return it to and retain it in a central position to aline the central set of totalizer elements with the actuators; a depressible selecting key for each set of totalizer elements, certain of said keys constructed and arranged to rock the segment in one direction an extent corresponding to the depressed one of said keys, and other of said keys constructed and arranged to rock the segment in the opposite direction an extent corresponding to the depressed one of said keys to aline the corresponding sets of totalizer elements with the actuators; means to hold the depressed selecting key in depressed condition to cause the segment to maintain the selected set of totalizer elements in alinement with the actuators; means effective near the end of machine operation to release the holding means to free the depressed selecting key and the segment for return to undepressed position and central position, respectively; and means operated by the releasing means while operating to release the holding means to momentarily increase the spring-load of the member to insure that the segment is returned to central position.

4. In a machine of the character described, having a plurality of sets of totalizer elements on a shiftable line and a single set of actuators for the plurality of sets of totalizer elements, the combination of a depressible key for each set of totalizer elements; means including a segment actuated by depression of the keys for shifting the line to aline the set of totalizer elements corresponding to the depressed key with the amount actuators, said segment having a cam aperture therein; a pivoted member having a roller coacting with the cam aperture; two separate yieldable means coacting with the member to cause the roller, in cooperation with the aperture, to restore the segment from its preset position under control of the depressed key to a central position each machine operation; and means effective near the end of each machine operation to increase the tension of one of the yieldable means to facilitate the restoration of the shifting means to said central position.

5. In a machine of the character described, having a plurality of sets of totalizer elements on a shiftable line, and a single set of actuators for the plurality of sets of totalizer elements, the combination of a depressible key for each set of totalizer elements; means including a segment actuated by depression of the keys for shifting the line to aline the corresponding set of totalizer elements with the actuators, said segment having a cam aperture therein; a pivoted member having a roller coating with the cam aperture; yieldable means coacting with the member to cause the roller, in cooperation with the aperture, to restore the segment and the shifting means from preset position to a central position near the end of each machine operation; an arm mounted on the same pivot as the member; a second yieldable means tensioned between the arm and the member; and means effective near the end of each machine operation and coacting with the arm to increase the tension of the second yieldable means to facilitate the restoration of the segment and the shifting means to said central position.

6. In a machine of the class described, having a plurality of sets of totalizer elements on a shiftable line, and a single set of actuators for the plurality of sets of totalizer elements, the combination of a depressible key for each set of totalizer elements; means including a segment actuated by depression of the keys for shifting the line different extents to aline the set of totalizer elements corresponding to the depressed key with the amount actuators, said segment having a cam aperture therein; a pivoted member having a roller coacting with the cam aperture; an arm mounted on the same pivot as the member; yieldable means tensioned between the arm and the member; and means effective near the end of each machine operation and coacting with the arm to increase the tension of the yieldable means to cause the roller, in cooperation with the aperture, to restore the segment and the shifting means from preset position to a central position, where a particular intermediate set of totalizer elements is alined with the amount actuators.

7. In a machine of the character described, having a plurality of sets of totalizer elements on a shiftable line, and a single set of actuators for the plurality of sets of totalizer elements, the combination of a depressible key for each set of totalizer elements; means including a segment actuated by depression of the keys for shifting the line from a central or starting position different extents to aline the set of totalizer elements corresponding to the depressed key with the actuators, said segment having a cam aperture therein; an arm and a member mounted on a common pivot, said member carrying a roller arranged to coact with the camming aperture; yieldable means tensioned between the arm and the member and effective to urge them toward each other; stop means on the arm and the member to limit their movement toward each other; and automatic means effective near the end of each machine operation to move the arm away from the member to increase the tension of the yieldable means to cause the roller, in cooperation with the cam aperture, to restore the segment and the shifting means from preset position to a central starting position, to reduce the extent of shifting movement required of said segment and shifting means under control of the depressible keys.

References Cited in the file of this patent

UNITED STATES PATENTS

| | | |
|---|---|---|
| 2,503,865 | Christian | Apr. 11, 1950 |
| 2,558,458 | Pitman | June 26, 1951 |
| 2,657,854 | Demeulenaere | Nov. 3, 1953 |
| 2,759,667 | Werner et al. | Aug. 21, 1956 |

FOREIGN PATENTS

| | | |
|---|---|---|
| 393,296 | Germany | Mar. 31, 1924 |

UNITED STATES PATENT OFFICE
CERTIFICATE OF CORRECTION

Patent No. 2,911,141                                        November 3, 1959

John M. Jackson et al.

It is hereby certified that error appears in the printed specification of the above numbered patent requiring correction and that the said Letters Patent should read as corrected below.

Column 3, line 38, after "with" insert -- the --; column 5, line 2, for "to the arm" read -- of the arm --; column 22, line 32, for "coating" read -- coacting --.

Signed and sealed this 3rd day of May 1960.

(SEAL)
Attest:

CARL H. AXLINE                                            ROBERT C. WATSON
Attesting Officer                                     Commissioner of Patents